United States Patent [19]
Clanin

[11] Patent Number: 6,158,094
[45] Date of Patent: Dec. 12, 2000

[54] MECHANICAL CLAMP CONTROLLING

[76] Inventor: William Rene Clanin, P.O. Box 2413, Oakhurst, Calif. 93644

[21] Appl. No.: 09/103,657

[22] Filed: Jun. 23, 1998

[51] Int. Cl.[7] .................................................. F16L 33/08
[52] U.S. Cl. .......................... 24/274 R; 24/279; 411/403; 411/404; 411/410; 411/919
[58] Field of Search .................... 24/274 R, 19, 24/279, 20 LS; 411/403, 404, 410, 402, 919

[56] References Cited

U.S. PATENT DOCUMENTS

| | | |
|---|---|---|
| 519,962 | 5/1894 | Mallock . |
| 1,331,824 | 2/1920 | Powers . |
| 1,398,234 | 11/1921 | Landis . |
| 1,628,553 | 5/1927 | Owens . |
| 2,229,565 | 1/1941 | Hallowell, Jr. . |
| 2,679,778 | 6/1954 | Krafft . |
| 3,604,486 | 9/1971 | Henry ........................................ 145/50 |
| 3,769,665 | 11/1973 | McKown, Jr. ............................ 24/274 |
| 4,028,968 | 6/1977 | DeAmicis ................................. 81/71 |
| 4,246,811 | 1/1981 | Bondhus et al. ......................... 81/436 |
| 5,251,521 | 10/1993 | Burda et al. . |
| 5,606,898 | 3/1997 | Franciskovich et al. . |
| 5,682,651 | 11/1997 | Sauer . |
| 5,682,801 | 11/1997 | Waechter . |

FOREIGN PATENT DOCUMENTS

| | | |
|---|---|---|
| 829 126 | 1/1952 | Germany . |
| 22423 | of 1911 | United Kingdom . |

*Primary Examiner*—James R. Brittain
*Attorney, Agent, or Firm*—Fish & Richardson P.C.

[57] ABSTRACT

A mechanical clamp used to secure hoses includes an elongated band. The band surrounds a central region and has a sequence of slots along its length. An adjustment screw has a hexagonal head that rotates about a longitudinal axis and has a thread that extends into the slots. Rotation of the screw adjusts the area of the central region. The head of the screw allows a driver to transfer torque to the head of the screw at an angle from the axis of rotation. The head is either curved or angled to allow a driver to efficiently engage the head of the screw during rotation when placed at an angle to the axis of rotation.

9 Claims, 11 Drawing Sheets

MECHANICAL CLAMP CONTROLLING

The invention relates to controlling mechanical clamps that are used to secure hoses.

A commonly used mechanical hose clamp contains an elongate metal strip that is coiled to form a single loop. An example of such an adjustable clamp is described in U.S. Pat. No. 3,769,665. A screw adjusts the circumference of the loop: constricting the circumference tightens the clamp and expanding the circumference loosens the clamp. The screw has a head with an interface on the distal end to accommodate a driver. Typically, the interface is slotted to accommodate a screwdriver. Alternatively, the head may contain multiple interfaces, e.g., a hex head and a slot to accommodate both a wrench and a screwdriver.

However, the location of the conventional clamp, e.g., within an engine compartment, often makes turning the screw difficult. Other components and structures often occupy the space directly adjacent to the clamp and restricts direct in line access of a tool for rotating the screw.

One aspect of the invention is a mechanical clamp that has an elongate band. The elongate band forms a loop that has an adjustable cross-section area. The band contains a series of transverse slots that cooperate with the thread of a screw. The cross-sectional area changes as the screw rotates about a longitudinal axis.

The screw has a head with a plurality of sides. Each side has at least two edges, and one edge of each side forms an edge of another side. The sides extend in a longitudinal direction and have a curved portion. The distance from a central point of the head to an edge of each side is substantially unvaried along the curved portion. The curved portion extends in a positive longitudinal direction and a negative longitudinal direction relative to the central point. Therefore, a tool may engage the head and transfer torque to the screw when the position of the tool is at an angle relative to the longitudinal axis.

Preferred embodiments of this aspect of the invention may include one or more of the following features.

Each side of the head may have substantially the same dimensions. The number of sides may be six. A distal portion, which is disposed about the longitudinal axis, may have a recess to accommodate a driver. The recess may be hexagonal, a slot, a Torx or a Phillips recess.

Another aspect of the invention is an engine hose clamp similar to the engine hose clamp described above. However, the sides of the head have at least four edges including two side edges, a distal edge, and a proximal edge. The side edges extend in a longitudinal direction. One side edge of each side is also a side edge of another side. The distal edge is smaller than said proximal edge. Therefore, a tool may engage the head and transfer torque to the screw when the position of the tool is at an angle relative to the longitudinal axis.

In a preferred embodiment of this aspect of the invention, each side of the head is planar.

Each embodiment of the invention may have one or more of the following advantages. A tool may transmit torque to the clamp from a range of angles relative to the axis of rotation. The clamp supports standard tools, e.g., Allen wrenches, Allen sockets, conventional sockets, conventional wrenches, Torx drivers, slotted screw drivers, and Phillips screw drivers. Therefore, the clamp does not require the purchase of specialized or angled tools. Several different tools may be selected for use with a single clamp. The clamp allows quick and efficient use by an operator. Other advantages will be apparent from the detailed description.

FIG. 1b is a top schematic view of the hose clamp of FIG. 1a;

FIG. 2a is a side schematic view of an embodiment of a screw head included in the hose clamp of FIG. 1a;

FIG. 2b is a top schematic view of the screw head of FIG. 2a;

FIG. 3a is a side schematic view of an embodiment of a screw head included in the hose clamp of FIG. 1a;

FIG. 3b is a top schematic view of the screw head of FIG. 3a;

FIG. 4 is a top schematic view of an embodiment of a screw head included in the hose clamp of FIG. 1a;

Figure 1A:
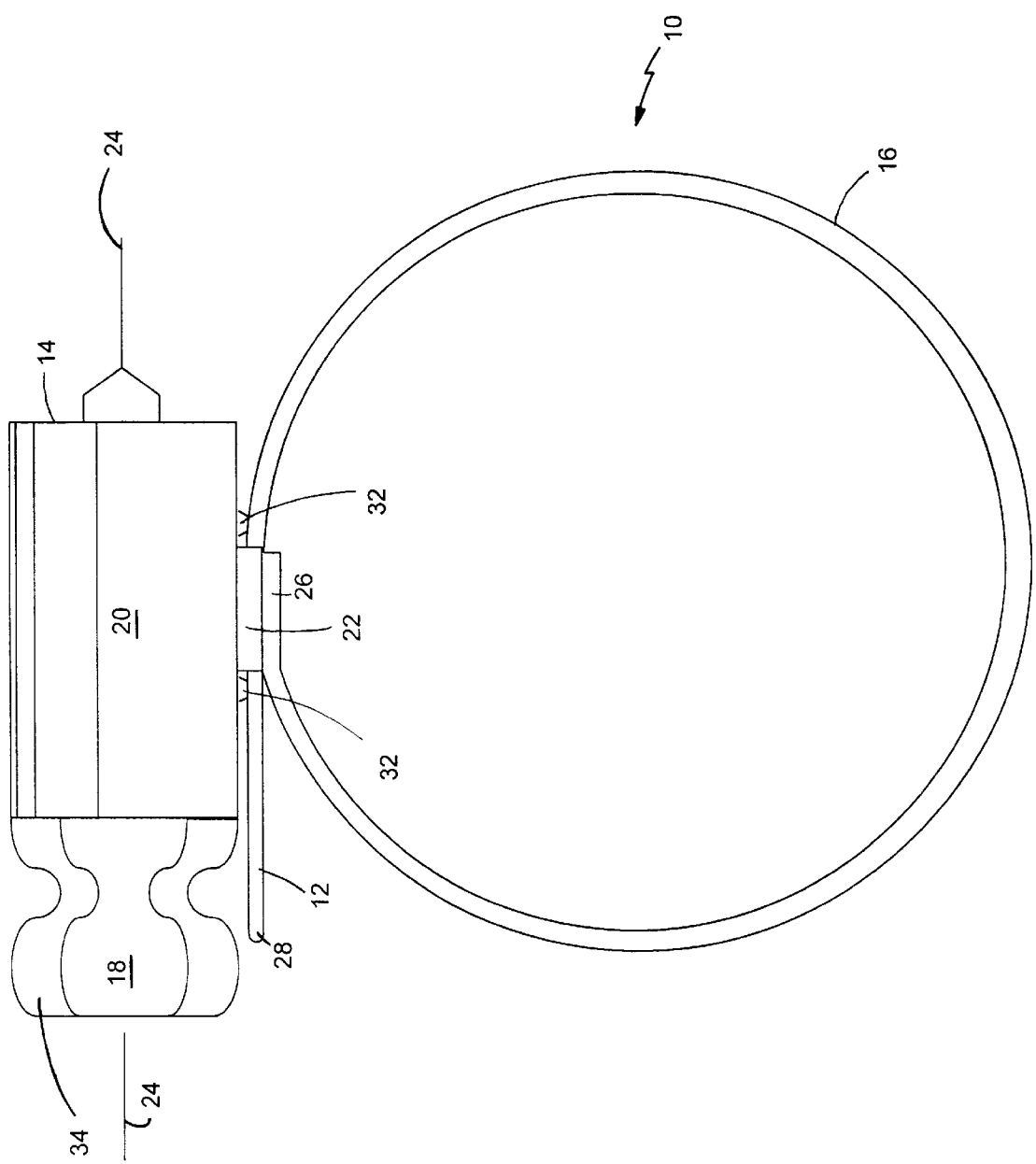
FIG. 1a is a side schematic view of a hose clamp; with a screw according doing to the invention.
Figure 2B:
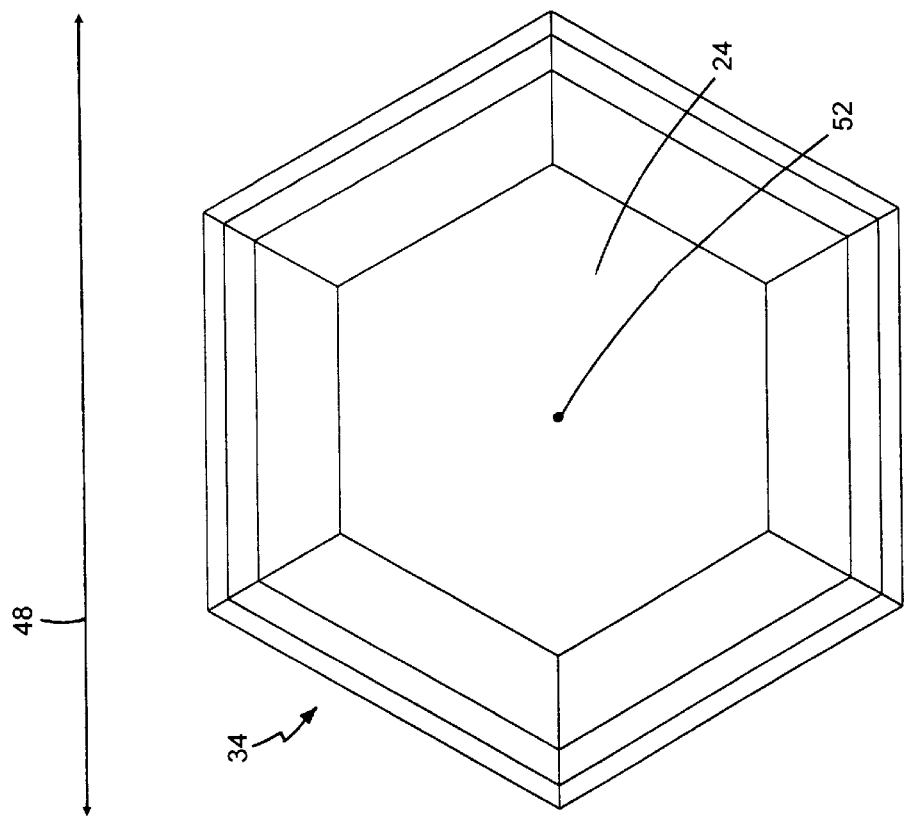
Figure 2A:
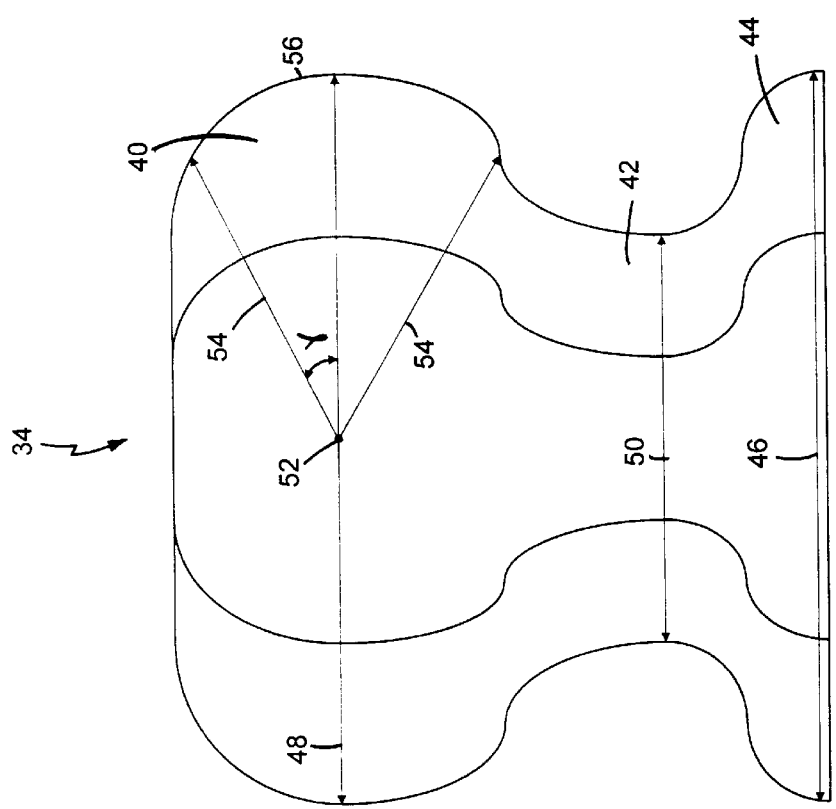
Figure 5:
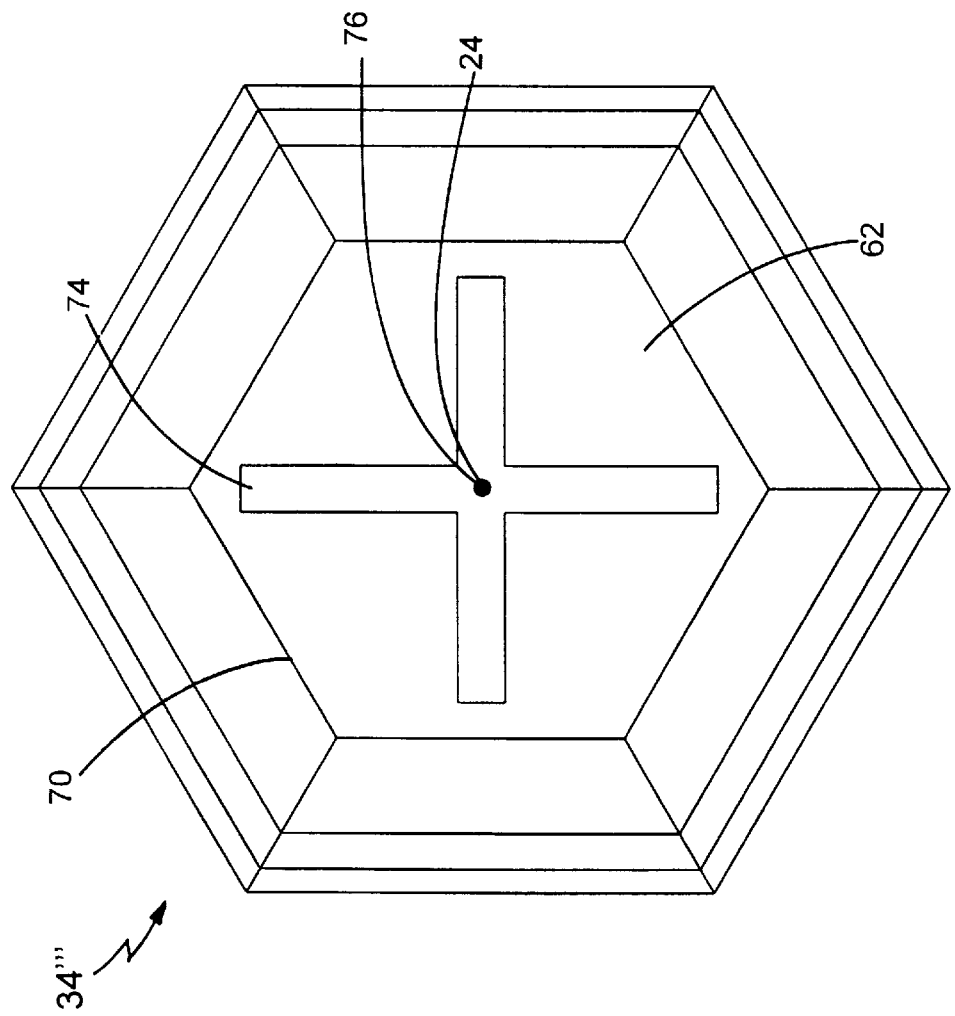
Figure 6:
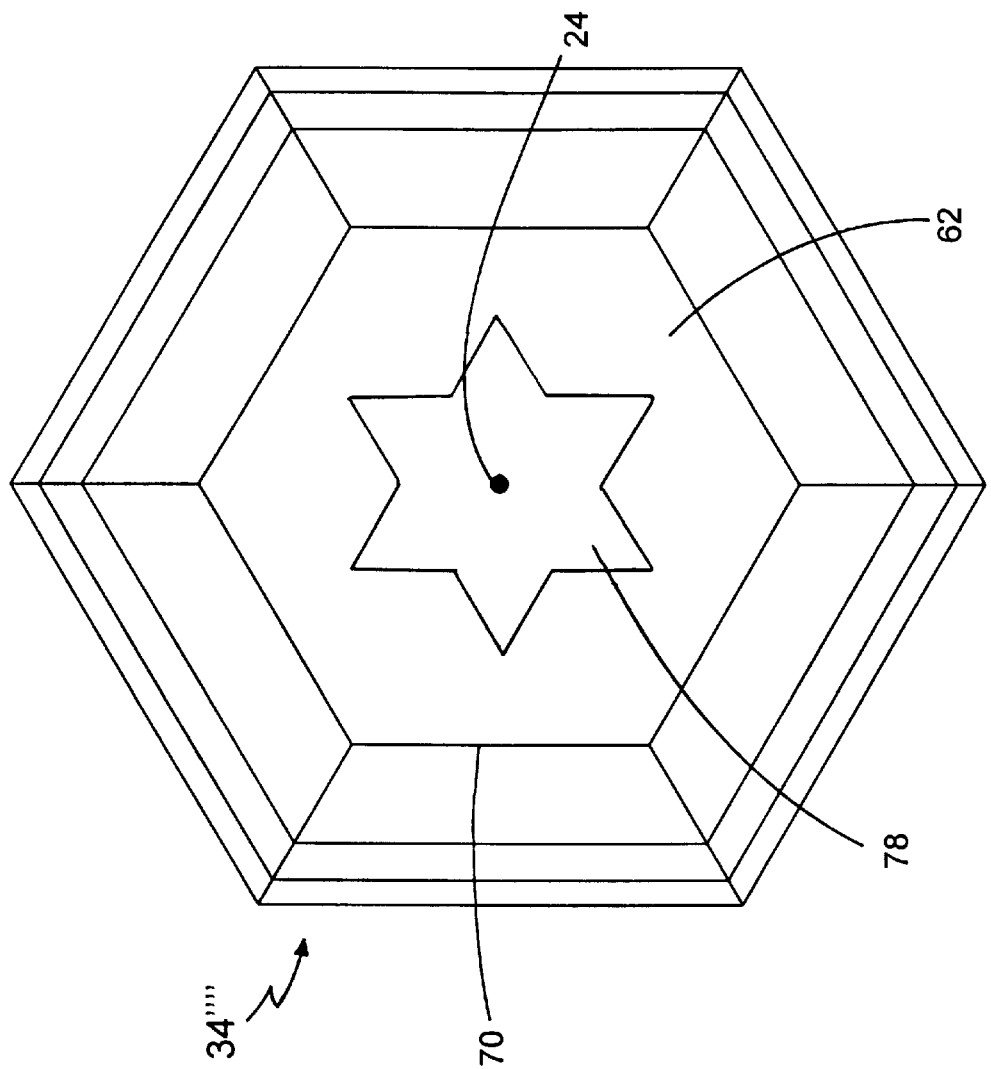
Figure 7:
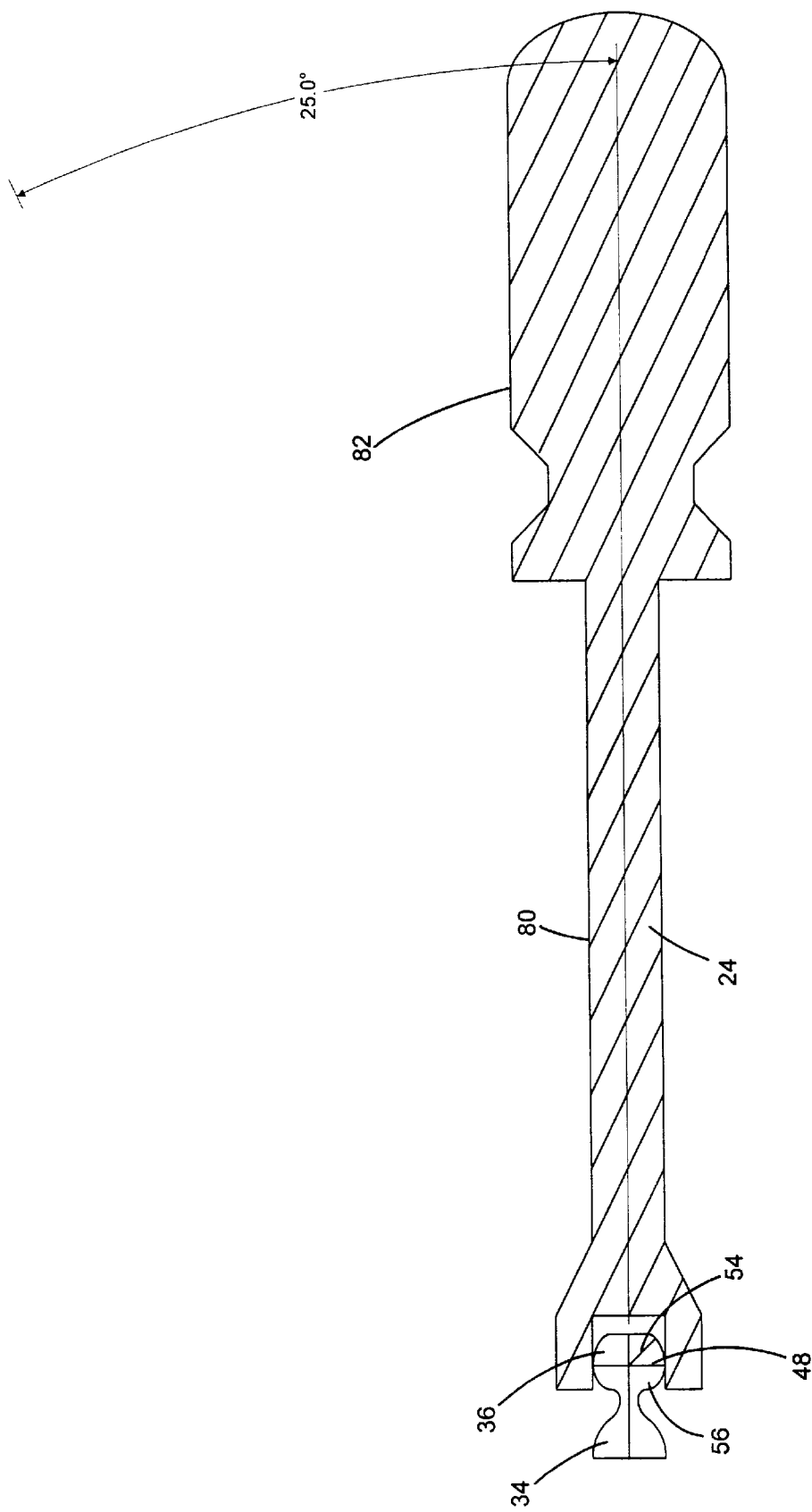
Figure 8B:
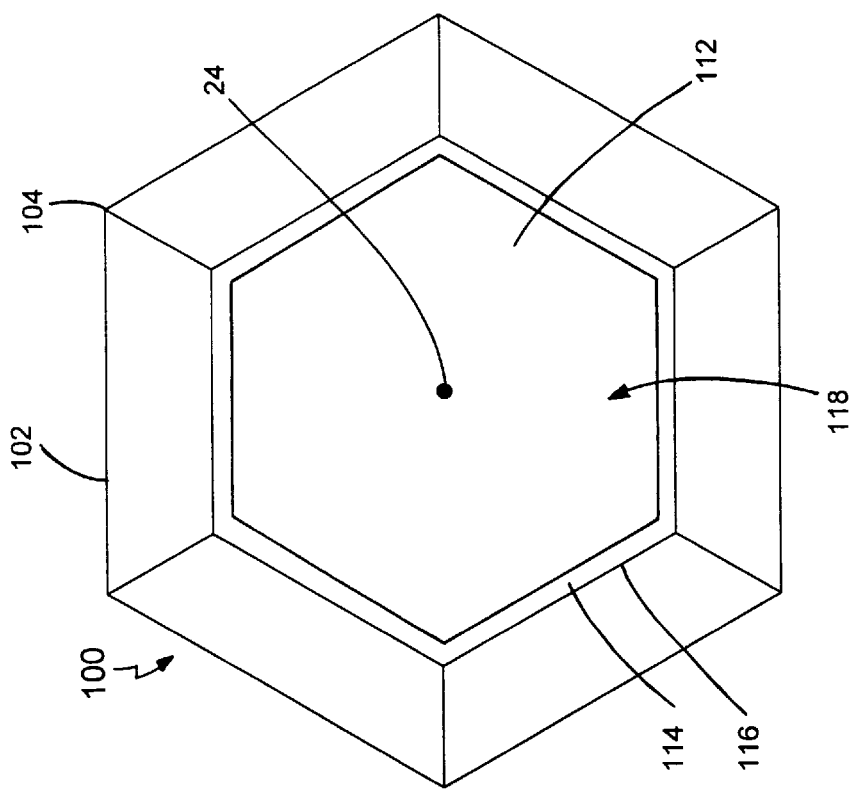
Figure 8A:
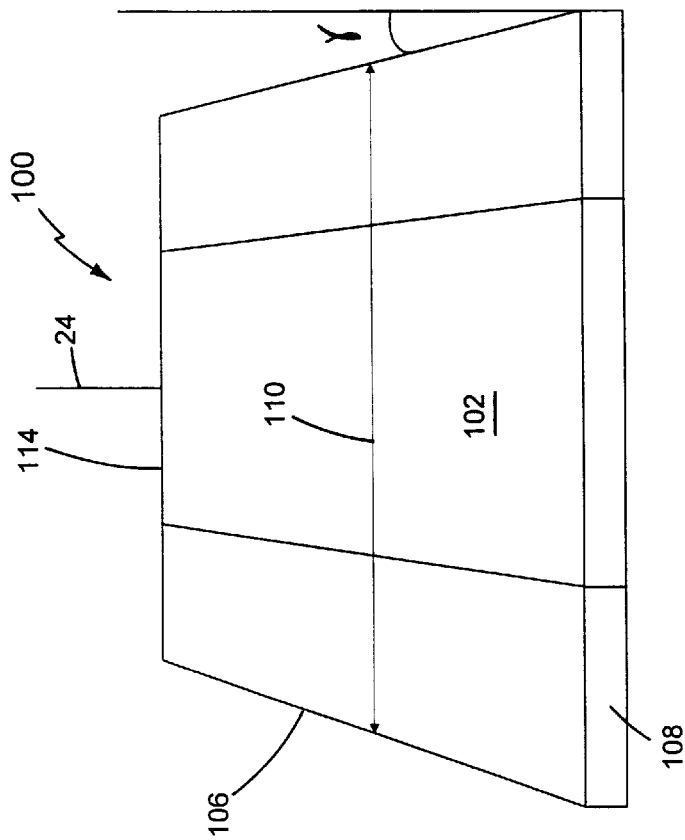
Figure 9:
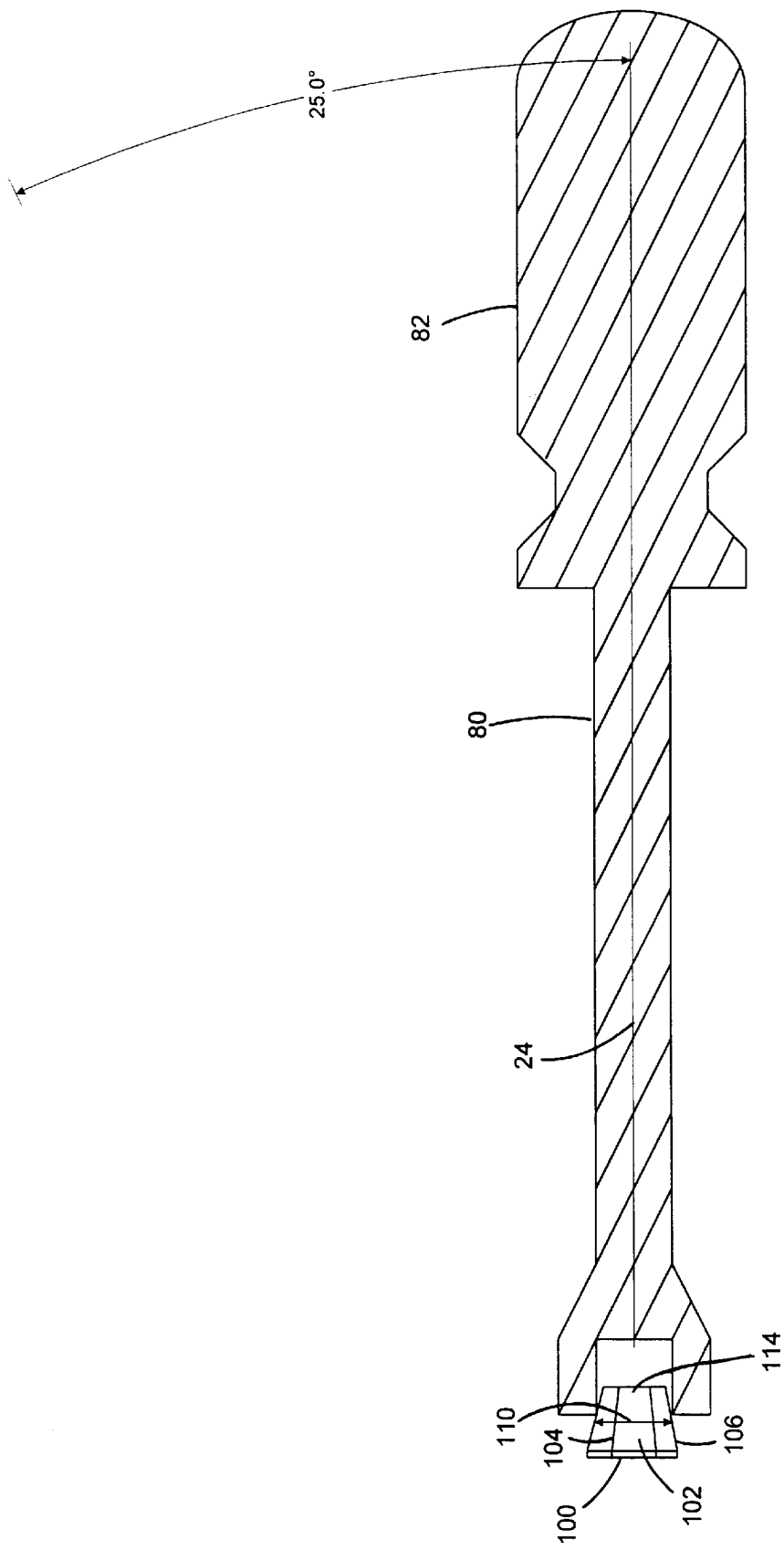
Figure 10:
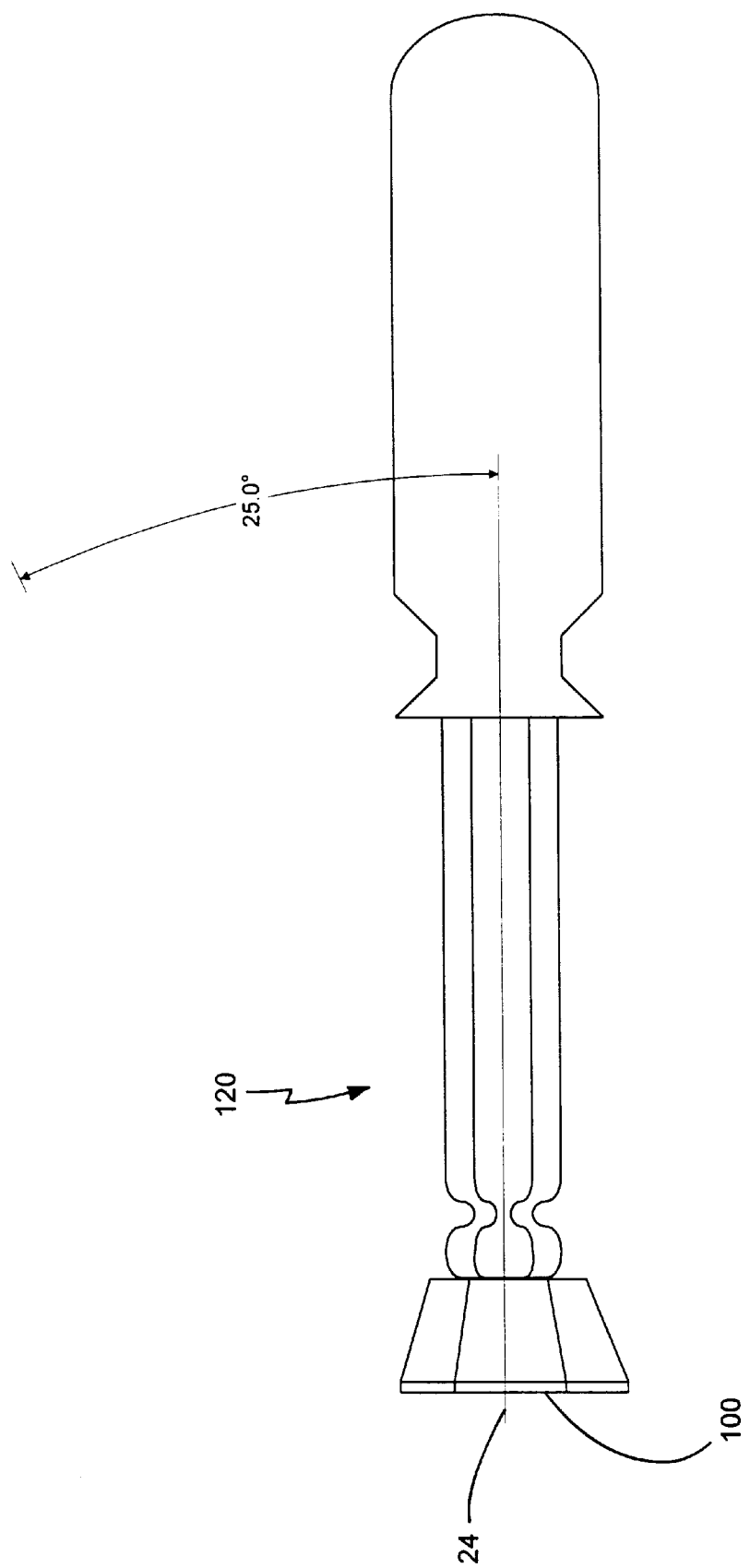

FIG. 5 a top schematic view of an embodiment of a screw head included in the hose clamp of FIG. 1a;

FIG. 6 is a top schematic view of an embodiment of a screw head included in the hose clamp of FIG. 1a;

FIG. 7 is a schematic view of a tool used in conjunction with the screw head of FIG. 2a;

FIG. 8a is a side schematic view of an embodiment of a screw head of the invention;

FIG. 8b is a top schematic view of the screw head of FIG. 7a;

FIG. 9 is a schematic view of a driver used in conjunction with the screw head of FIG. 8a; and FIG. 10 is a schematic view of a driver used in conjunction with the screw head of FIG. 8a.

Figure 1B:
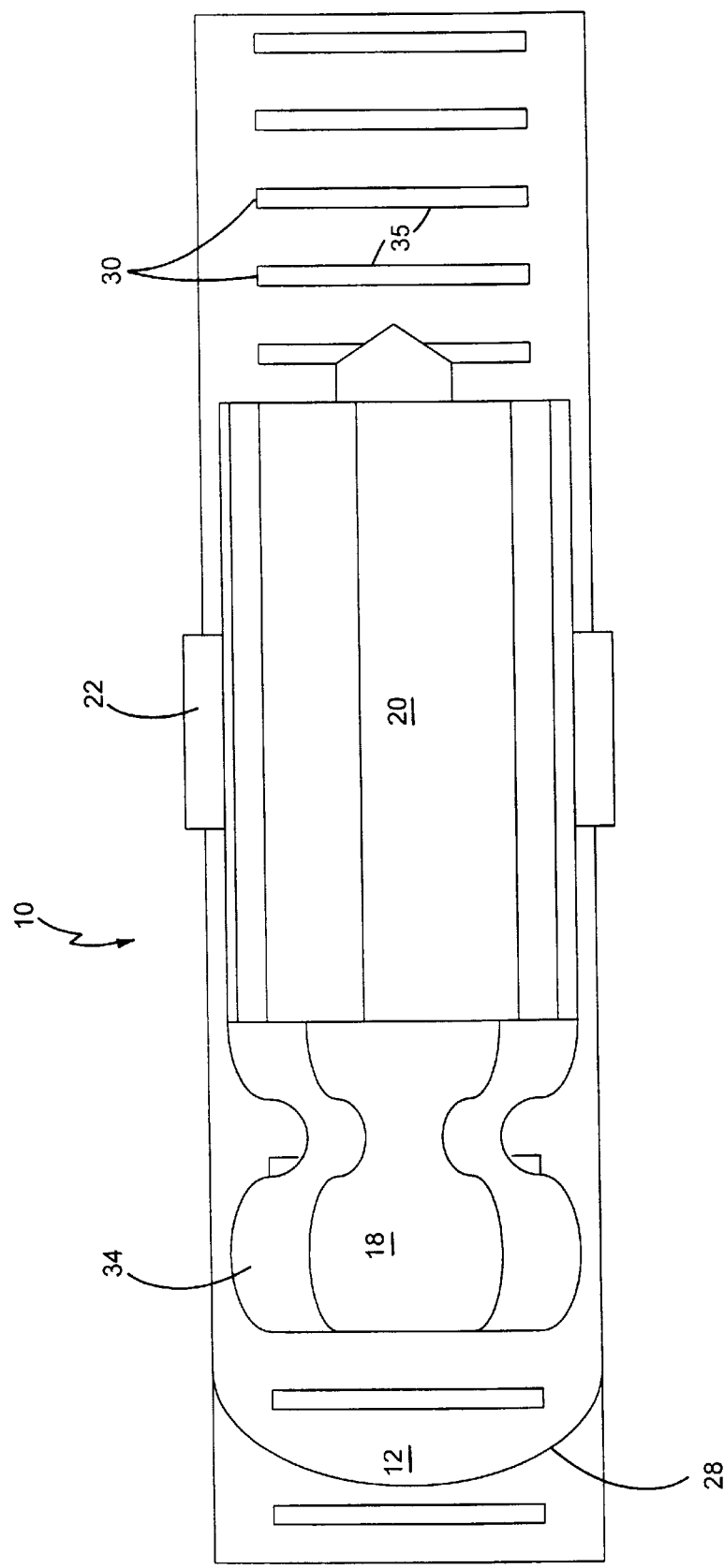

Referring to FIGS. 1a and 1b, a clamp 10 suitable for use in an open or restricted space, e.g, in an engine, particularly for use in securing a hose to an automobile engine, includes an elongate metal strip 12 and an adjustment mechanism 14. Metal strip 12 coils to form a single loop 16. Adjustment mechanism 14 adjusts the diameter and circumference of loop 16.

Adjustment mechanism 14 includes a screw 18, a housing body 20, and a housing mount 22. Housing body 20 secures screw 18 such that screw 18 may rotate freely about a longitudinal axis of rotation 24. Housing mount 22 secures housing body 20 to one end 26 of metal strip 12 such that the axis of rotation 24 parallels the elongated direction of the metal strip 12. When metal strip 12 coils to form loop 16, the free end 28 of metal strip 12 passes between adjustment mechanism 14 and the opposite end 26 of metal strip 12. Adjustment mechanism 14 resides on the outside of loop 16.

Metal strip 12 includes slots 30. Slots 30 are transverse to the elongate direction of metal strip 12 and, therefore, are transverse to the axis of rotation 24 of screw 18. Because the free end 28 of metal strip 12 passes close to screw 18, the thread 32 of screw 18 extends into the slots 30 that are adjacent to adjustment mechanism 14. When screw 18 rotates about axis 24, thread 32 engages the edges 35 of slots 30. Therefore, when screw 18 rotates, tread 32 pulls or pushes slots 30 past housing 20, and the adjustment mechanism expands or constricts loop 16.

Referring also to FIGS. 2a; and 2b, screw 18 includes a curved hexagonal head 34 to accommodate a hexagonal driver with its axis angularly displaced from the rotational axis 24 of screw 18 to facilitate rotation of screw 18 in awkward locations where axial alignment of tool and screw results in difficulties in applying torque to the screw with the tool. When viewed along rotational axis 24, FIG. 2b, head 34 has a hexagonal appearance. Head 34 has six flat sides 36 of equal length. Sides 36 intersect to form six angles 38 of 120° each.

When viewed from the side of screw 18, FIG. 2a, head 34 has a generally spherical appearance. Head 34 includes a curved portion 40, a neck 42, and a base 44 that attaches head 34 to the shank of the screw. Curved portion 40 typically has a maximum width 48 that is, e.g., ⅜" across. Base 44 has a width 46 that is approximately equal to the maximum width 48 of curved portion 40. Neck 42 has a minimum width 50 that is approximately ⅔ the maximum width 48 of curved portion 40.

A central point 52 is the midpoint of maximum width 48. Radii 54, which are equal to half the distance of maximum width 48, extends from central point 52 to the outer arcuate surface 56 of curved portion 40. In effect, maximum width 48 is an equatorial line that divides arcuate surface 56 into two sections of equal area. The angle γ is the angle defined by radii 54 above and below the equatorial line, i.e., the maximum width 48. For example, the angle y is typically 250®.

Figure 3B:
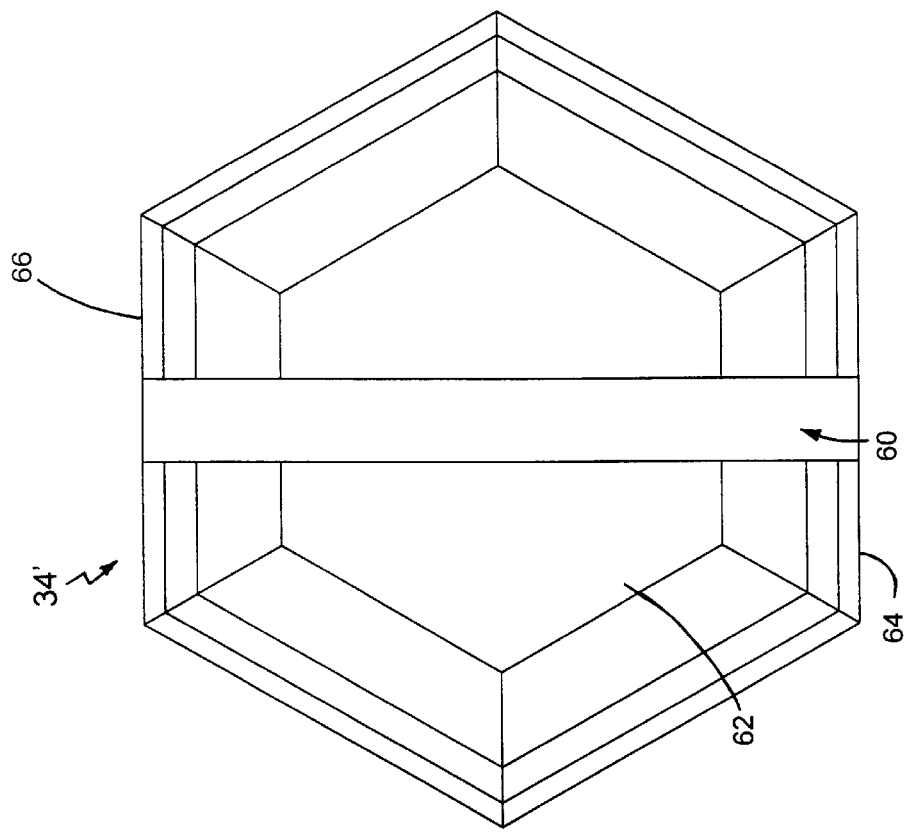
Figure 3A:
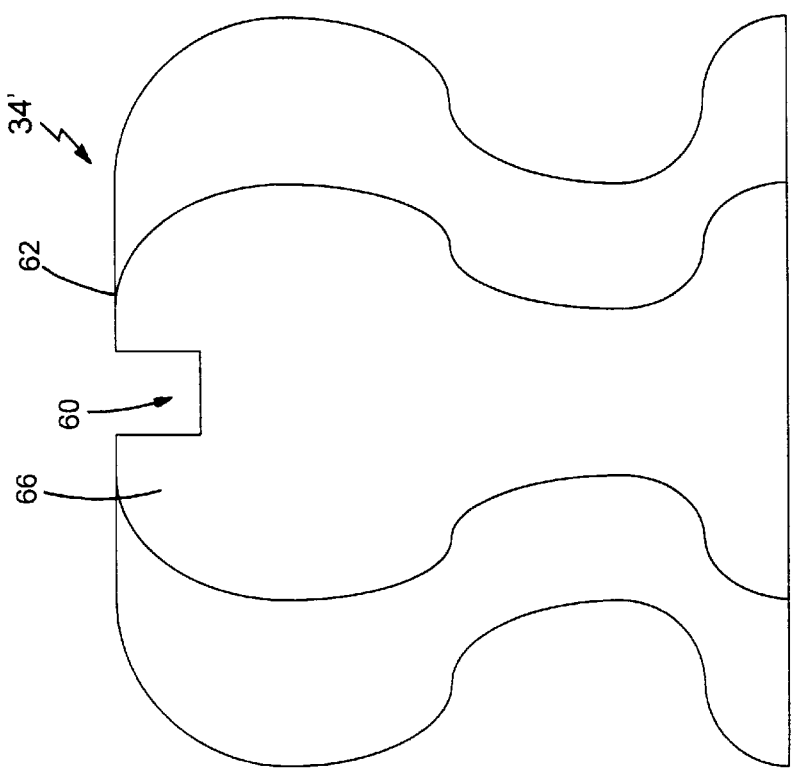

Head 34 also contains additional structures to accommodate other drivers. For example, as shown in FIG. 3a and 3b, a slot 60 extends across a distal end 62 of head 34'. Slot 60 accommodates a slotted screwdriver. Slot 60 bisects head 34' and extends between opposing sides 64 and 66. Slot 60 is typically ³⁄₃₂" across and ⅛" deep.

Figure 4:
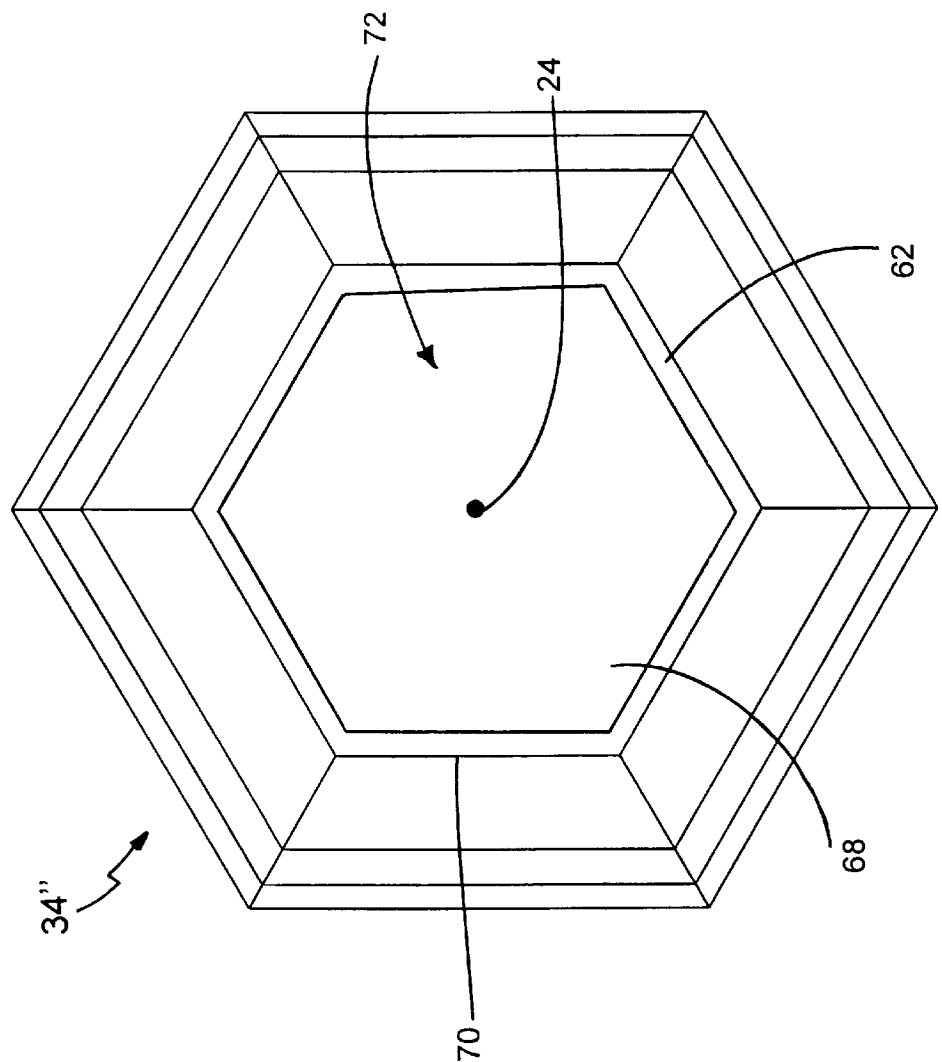

As shown in FIG. 4, an Allen recess 68 of head 34" lies within a perimeter 70 of distal end 62 to accommodate an Allen wrench. The Allen recess 68 forms a hexagonal opening 72 that is concentric with the hexagonal perimeter 70 when viewed along rotational axis 24. Allen recess 68 is typically ³⁄₁₆" across and ³⁄₁₆" deep.

As shown in FIG. 5, a Phillips recess 74 of head 34''' lies within perimeter 70 of distal end 62 to accommodate a Phillips-head screwdriver. Phillips recess 74 forms a cross with a center 76 that lies on the axis of rotation 24. Phillips recess 74 has a maximum depth at the center 76.

As shown in FIG. 6, a Torx recess 78 of head 34'''' lies within a perimeter 70 of distal end 62 to accommodate a Torx wrench. Torx recess 78 forms a six-pointed star that is centered about rotational axis 24.

In operation, as shown in FIG. 7, head 34 accommodates a tool 80, e.g., a socket. The maximum width 48 of head 34, shown in FIG. 2a, is approximately equal to the size of socket 80. For example, a ⅜" head 34 is tolerance closely to a ⅜" socket 80 such that socket 80 fits closely over head 34 on all six sides 36. When tool 80 aligns with rotational axis 24, tool 80 may transfer torque from the handle 82 to the head 34.

When tool 80 is at an angle to rotational axis 24, curved portion 40, shown in FIG. 2a, continues to closely fit to tool 80 because curved portion 40 has a constant radius 54 throughout curved portion 40. Therefore, outer arcuate surface 56 contacts socket 80 on all six sides 36. Tool 80 can efficiently transfer torque to head 34 when at an angle to rotational axis 24. For example, tool 80 can engage head 34 at an angle that is offset from rotational axis 24 by 25° or less. In other words, the head 34 allows off axis rotation through a 50° arc.

Referring to FIGS. 8a and 8b, screw 18 may include an angled hexagonal head 100 to accommodate a hexagonal driver. When viewed along the rotational axis 24, as shown in FIG. 8b, head 100 has a hexagonal appearance. Head 100 has six flat sides 102 of equal length. Sides 102 connect at intersections 104 to form 120° angles.

When viewed from the side of head 100, as shown in FIG. 8a, head 100 has a generally angled appearance. Head 100 includes a sloped section 106 and a base 108 that attaches head 34 to the shank of the screw. In the sloped section 106, each side 102 is planar and forms an angle γ' with the rotational axis 24. Angle γ' is, e.g., 25°. The width 110, which extends across the midpoint of the sloped section 106, is, e.g., ⅜" across. The length of each side 102 is, e.g., ¼".

Head 100 also contains an Allen recess 112 at a distal end 114 to accommodate an Allen wrench. Allen recess 112 lies within a perimeter 116 of the distal end 114. When viewed along rotational axis 24, Allen recess 112 forms a hexagonal opening 118 that is concentric with the hexagonal perimeter 116. Allen recess 112 is, e.g., ³⁄₁₆" across and ³⁄₁₆" deep.

In operation, as shown in FIG. 9, head 100 accommodates a tool 80, e.g., a socket. The width 110 of head 100 is approximately equal to the inner-width of a socket 80, shown in FIG. 7. For example, a ⅜" head 100 is closely tolerance to a ⅜" socket 80 such that the socket 80 fits closely over head 100 on all six sides 102. When tool 80 aligns with rotational axis 24, tool 80 may transfer torque from handle 82 to head 100.

When tool 80 is at an angle to the rotational axis 24, sloped section 106 continues to closely fit to tool 80 because sloped section 106 narrows near distal end 114. Therefore, socket 80 contacts all six sides 102 at the angled intersections 104. Tool 80 can efficiently transfer torque to head 100 when at an angle to rotational axis 24. For example, tool 80 can engage head 34 at an angle that is offset from the rotational axis 24 by 25 or less.

Referring to FIG. 10, a ball point hexagonal tool 120 is known in the prior art. Tool 120 also transfers torque at an angle from rotational axis 24. Tool 120 can be used in conjunction with Allen recesses 112 and 68, shown in FIGS. 8b and 4 respectively. Recesses 112 and 68 accommodate a ³⁄₁₆ ballpoint hexagonal tool 120.

Other embodiments are within the scope of the following claims.

For example, the head of screw 18 may have alternate configurations. The head may be triangular, octagonal, or some alternate geometric structure. The sides of the head may vary in length and width. The sides may not be uniform. Similarly, the angles of the intersections of the sides may be varied and not uniform. The maximum width 48 divides the curved portion 40 into two sections of unequal area. The radius 54 may not be equal to one half the maximum width 48 at all points above or below the maximum width 48. The angled sides of head 100 may be curved rather than planar.

In addition, the width of the head of the screw may be of varying sizes. The width of the head may accommodate metric sized tools or standard size tools other than ⅜". The width of the head may also accommodates non-standard sized tools.

Several combinations can be used. For example, either the curved head or the angled head can be combined with any of the recesses: Allen, slot, Torx, Phillips, or a smooth end.

What is claimed is:

1. A mechanical clamp comprising:
    an elongate band formed with a sequence of slots along its length, said band surrounding a central region of adjustable cross-section area;
    an adjustment screw having a head that rotates about a longitudinal axis and having thread portions that extend into respective ones of said slots, said head having an outer surface with a plurality of sides, each side of said plurality having a first edge and a second edge, each first edge and each second edge having a curved portion, said edges extending in a longitudinal direction, said first edge of each side being said second edge of another side, the head having a central point;
    a distance from said central point to each side being substantially unvaried along a curved portion of each first edge, said curved portion extending in a positive longitudinal direction and a negative longitudinal direction relative to said central point; and said clamp being constructed and arranged so that rotation of said adjustment screw controls said adjustable cross-sectional area of said central region, whereby a tool may engage said head and couple torque to said screw about its longitudinal axis when the tool axis is angularly placed from said longitudinal axis.

2. The mechanical clamp of claim 1 wherein said screw engages said elongate band to adjust the circumference of said band surrounding said central region.

3. The mechanical clamp of claim 1 wherein each side of said plurality has substantially the same dimensions.

4. The mechanical clamp of claim 1 wherein the number of sides of said plurality is six.

5. The mechanical clamp of claim 1 further comprising a distal portion disposed about said longitudinal axis, said distal portion having a recess to accommodate other drivers.

6. The mechanical clamp of claim 5 wherein said recess is a hexagonal recess.

7. The mechanical clamp of claim 5 wherein said recess is a slot recess.

8. The mechanical clamp of claim 5 wherein said recess is a Phillips recess.

9. The mechanical clamp of claim 5 wherein said recess is a Torx recess.

\* \* \* \* \*